Sept. 17, 1968 A. A. GOLDBERG 3,401,899

CARTRIDGE AND CARTRIDGE CARRIER

Filed Dec. 30, 1965 2 Sheets-Sheet 1

INVENTOR.
ABRAHAM A. GOLDBERG

BY

Brumbaugh, Free, Graves & Donohue his ATTORNEYS.

INVENTOR.
ABRAHAM A. GOLDBERG
BY
Brumbaugh, Free, Graves & Donohue
his ATTORNEYS.

United States Patent Office 3,401,899
Patented Sept. 17, 1968

3,401,899
CARTRIDGE AND CARTRIDGE CARRIER
Abraham A. Goldberg, Stamford, Conn., assignor to Columbia Broadcasting System, Inc., New York, N.Y., a corporation of New York
Filed Dec. 30, 1965, Ser. No. 517,752
14 Claims. (Cl. 242—55.13)

ABSTRACT OF THE DISCLOSURE

A cartridge and cartridge carrier mechanism for use with recording and reproducing equipment, in which the cartridge includes spaced apart, relatively movable base and cover members defining a space for receiving a wound coil of strip material carrying the information to be recorded or reproduced. Resilient means carried by the cartridge and mutually reacting with portions of the base and cover members normally holds the cover member in a position in which a rim portion thereof engages the periphery of the coil to prevent the material from unwinding when the cartridge is not in use. The cartridge is engageably supported by a rotatable carrier including a spindle over which the cartridge is slipped, and an elevator platform axially movable with respect to the spindle. When the cartridge is inserted over the spindle and supported by the platform, the cartridge and platform may be manually depressed together to a position in which a releasable latch in the spindle retains the cartridge and platform in its depressed position. At the same time, downward movement of the carrier platform causes arms in the spindle to project radially outwardly to move the base member axially in relation to the cover member and release the cover member from its engagement of the coil to allow it to unwind.

Figure 1:
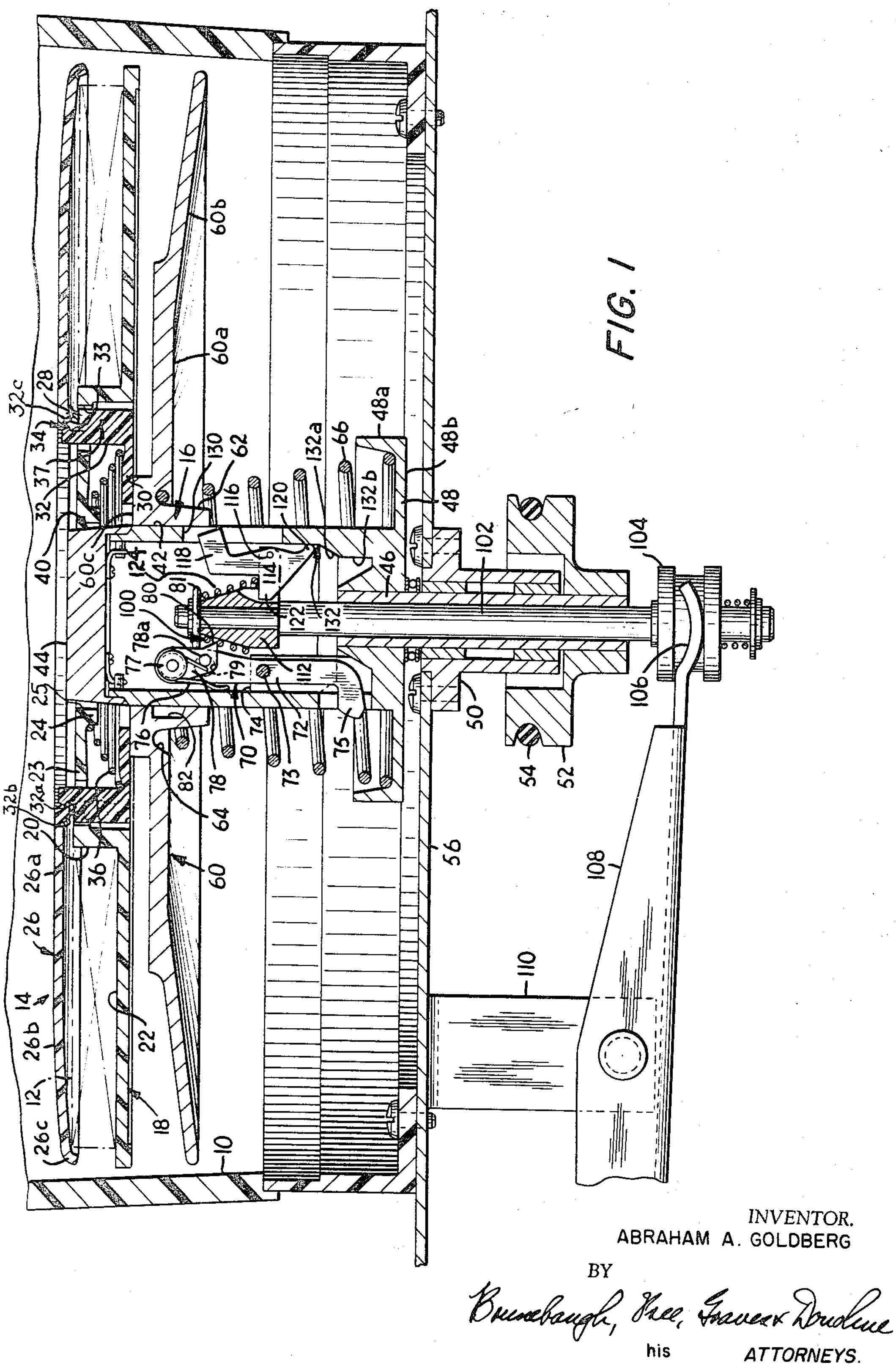

This invention relates to novel and improved apparatus for supplying strip material from a coil and, more particularly, to a cartridge and cartridge carrier of a type which can be used, for example, in a tape deck as the tape supply.

In most currently available tape decks the tape is coiled on a simple reel which is installed on a rotatable spindle, and is manually threaded through the transducer device and secured to a driven take-up reel. More recently, cartridge-type tape decks, many of which involve a continuous tape which is taken off the outside of a reel and returned to the inside of the same reel, have been suggested. Various tape deck cartridges have been devised which include arrangements for retaining the tape on the reel and preventing it from unwinding when it is not in use. Both in the continuous type and in the conventional supply tape cartridges, the tape is usually released only by performing certain manual operations, such as releasing a lever or orienting the cartridge in a specific position relative to the spindle. Often, the release operations require special knowledge of the equipment by the user and are susceptible of malfunction when correct procedures are not followed.

There is provided, in accordance with the invention, a novel and improved tape supply apparatus comprising a cartridge having a flange and hub for carrying the coil of the tape and a member positioned to engage the coil to keep the tape from unwinding and a rotatable cartridge carrier which includes a spindle for receiving the cartridge and a mechanism on the spindle for moving the tape holding member and the coil receiving flange apart so that the tape is released and can be unwound from the cartridge. Preferably, the actuating mechanism includes a shaft movable axially within the spindle which carries one or more actuator elements. The actuator elements are arranged to be moved, such as by a cam surface in the spindle, into engagement with one of the cartridge members and to move it relative to the other member, thereby releasing the coil so that the tape can be unwound. For example, the actuators may be pivotally mounted on the shaft and resiliently held such that a cam follower portion bears against the cam surface of the hub. Upon downward movement of the shaft in the spindle, the actuator first moves outwardly, and at the same time downwardly, and then moves downwardly into operative engagement with the cartridge to open it and release the tape.

Another feature of the cartridge carrier is the provision of an elevator for raising the cartridge off the spindle after use. The spindle mechanism may be recessed in a well, and a platform, slidably carried by the spindle, is normally held in an upward position, such as by a spring. The cartridge is placed on the elevator or platform and is manually pushed down to a lowermost position, as determined by seating of the elevator or an enlargement on the spindle. A latching mechanism is provided to hold the elevator in operating position. The latch may include a trip for releasing it and permitting the elevator to rise into the upper position after the tape has been run and rewound into the cartridge.

One important advantage of the apparatus of the invention is that it operates completely automatically. As previously described, the cartridge is placed on the elevator and is manually pushed down until its downward movement is stopped and the elevator is automatically latched in operating position. Thereafter, the actuator shaft of the mechanism is moved, such as by a lever operated by the user, to open the cartridge to make it ready for delivery of the tape. Desirably, the apparatus of the invention may be used with automatic film feeding and take-up arrangements, such as the one disclosed in the copending application of Abraham A. Goldberg, Ser. No. 425,580, filed Jan. 14, 1965, now Patent No. 3,312,407, which is assigned to the assignee of this application. The opening and closing of the cartridge are accomplished by positive movement of substantially rigid elements, as compared to some cartridges which involve resilient elements, such as reels having a cupped annulus as one flange which can be shifted between concave and convex configurations with respect to one face. The cartridge carrier has a limited number of moving parts, and, therefore, it can be constructed at relatively low cost and seldom needs maintenance or repair.

The cartridge and cartridge carrier are adapted for use in any system in which a strip of material is to be stored in a coil and unwound from the coil for some purpose. In addition to tape decks for recorded tape, the invention can be employed for the tape feeding apparatus in data processing tape input machine, in automated control systems, and in movie and strip film equipment, for example.

Figure 2:
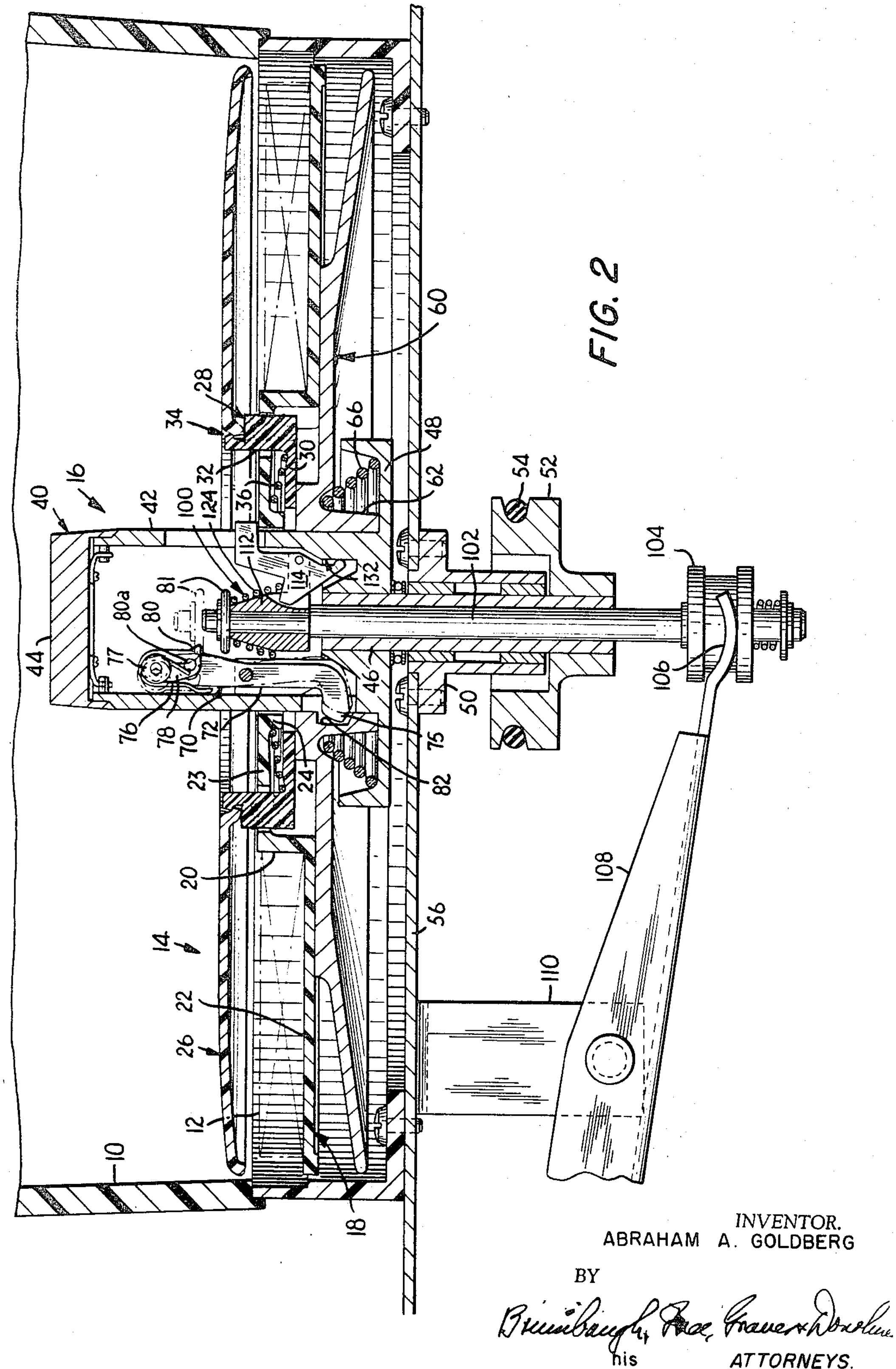

For a better understanding of the invention, reference may be made to the following description of an exemplary embodiment, taken in conjunction with the figures of the accompanying drawings, in which:

FIG. 1 is a view in section taken generally along a plane through the axis of the spindle of the cartridge carrier and showing the cartridge in its closed, non-operative position and the actuating mechanism of the carrier in a retracted position; and FIG. 2 is a view in section similar to FIG. 1, except that the cartridge and carrier are shown in their operating positions.

The cartridge and carrier illustrated in the drawings are part of a tape deck and are mounted in a well or recess 10 in the tape deck case. The tape is wound in a coil 12 in a cartridge 14 which, of course, is a separate element and serves not only as the tape supply in the deck but as the storage receptacle for the tape when not in use. The cartridge 14 is installed on a rotatable cartridge carrier 16 mounted in the tape deck well 10.

The cartridge 14 includes a base member 18 which consists of a hub 20 around which the tape is wound, a flat disc-like outwardly extending, flange portion 22 and a flange portion 23 extending inwardly from the upper end of the hub 20. At the inner edge of the flange 23 is a downturned rib 24 defining an opening 25. The hub 20 and flanges 22 and 23 may be molded from a suitable plastic material.

Generally overlying the tape coil 12 and of substantially the same outer diameter as the flange 22 is a cover member 26 in the form of an annulus having a generally flat inner portion 26*a*, a slightly downwardly sloping outer portion 26*b* and a relatively sharply downturned rim 26*c*. The cover member 26 is mounted for movement relative to the base member 18 between open and closed positions by a coupling piece 28. The coupling piece 28 includes a ring 30 located below the inwardly extending flange 23 of the base member 18 and a plurality of circumferentially spaced-apart, vertically extending connector elements 32, which may be three in number, spaced 120° apart about the axis of rotation of the cartridge 14.

Each of the elements 32 passes through an opening 33 in the flange portion 23 and is secured to the cover member 26 by a snap-holding arrangement 34, the elements 32 being resilient and having hook-like upper ends 32*a* which engage cooperating detent portions 32*b* at the inner edge of the cover member 14, such that the detent portions 32*b* are retained between the hook-like upper ends 32*a* and shelf portions 32*c* formed on bosses 37 which extend radially outwardly from the elements 32, as shown in the drawings.

Located between the ring 30 and the flange 23 is a spring 36 which resiliently urges the cover member and base member together, as illustrated in FIG. 1, so that the rim 26*c* of the cover member 26 engages the perimeter of the tape coil 12 and holds it on the base member 18.

To assemble the cartridge, the coupling piece 28 is installed in place with the elements 32 extending through the flange portion 23, and the spring 36 in place. The cover member 26 is then pressed against the elements 32 which yield and then snap back to engage the snap-holding arrangements 34. The cover member is thus lightly held against the shelf portions 32*c* on the elements 32 so that it is locked against movement in either direction relative to the connector piece.

The cartridge carrier 16 includes a spindle 40 (FIG. 2) which is made up of an upper cylindrical body 42, a cap 44, a tubular support 46 and a base member 48. The spindle 40 is journaled in a mounting member 50 secured to the upper wall 56 of the tape deck. Attached to the lower end of the tubular support 46 of the spindle is a pulley 52 which is adapted to be driven by a belt 54 to rewind the tape on the cartridge, the belt 54 not being driven and the spindle and cartridge being freely rotatable during the play cycle of the tape deck.

Slidably mounted for vertical movement on the spindle body 42 is an elevator platform 60 (FIG. 1) which includes a substantially flat annular portion 60*a*, a sloping outer portion 60*b*, a flat raised inner portion 60*c*, and a mounting hub 62 which is slidably mounted on the outer surface of the cylindrical spindle body 42. Installed between a recess 64 adjacent the hub 62 of the platform 60 and a corner formed by a flange 48*a* and the body 48*b* of the member 48 of the spindle is a compression spring 66 which normally holds the platform in a raised position near the top of the tape deck well 10, as shown in FIG. 1.

When a tape is to be recorded or played, the cartridge, which will then be closed as illustrated in FIG. 1, is placed on the platform 60. (It will be noted that only the ring 30 of the cartridge connector piece 28 actually engages and is supported by the platform 60, specifically by the inner portion 60*c*.) The cartridge is then pushed down manually into a lowered position, as shown in FIG. 2, which is established by engagement of the lower edge of the platform hub 62 with the spindle member 48. At this point, a latch mechanism 70 (FIG. 2) mounted within the cylindrical body 42 of the spindle automatically engages and holds the platform in the lowered, operating position.

The latch mechanism 70 includes a latch element 72 which is pivotally mounted on a pin 73 carried by bosses 74 formed within the spindle body 42. At the lower end of the latch 72 is an outwardly extending detent 75 which passes through an opening in the spindle body 42 and, when in latched position, is received in a notch 82 provided in the platform hub 62 (FIG. 2). The detent 75 is urged outwardly by a spring 76 and has a curved upper edge, so that when the cartridge and platform are pushed downwardly, the detent is forced inwardly against the spring until the edge of the notch passes it. The detent then springs out into the notch 82 and holds the platform 60 in the down position.

Pivotally mounted by a pin 77 on the upper end of the latch element 72 is a trip element 78 which is engaged and urged inwardly relative to the latch by a portion of the spring 76. The relative inward movement of the trip element is limited, however, by engagement of a pin 78*a* fixed thereon against an edge of a slot 79 in the latch element. The slot is arranged to enable outward pivotal movement of the trip. At the lower end of the trip is a projection 80 which is engageable by a ring 81 which is part of a mechanism (described below) which moves axially within the spindle and automatically opens and closes the cartridge. When the ring 81 moves down with the mechanism, it contacts the projection 80 and pivots the trip element 77 against the spring, thereby enabling the mechanism to be moved down without disengaging the latch 72. Upon upward movement of the mechanism, however, engagement of the ring with the lower edge of the projection 80 causes the latch 72 to be pivoted about the pin 73 to disengage the detent 75 from the notch 82 in the platform, thereby permitting the platform to be lifted by the spring 66 to its raised position in the well.

In operation, the cartridge is adapted to be opened automatically by mechanism 100 to permit the tape to be unwound from the coil. The mechanism 100 includes an actuating shaft 102 extending upwardly through the tubular portion 46 and into the interior of the cylindrical body 42 of the spindle. Attached to the lower end of the shaft 102 is a coupling element 104 which receives a bifurcated end 106 on an actuating lever 108. The lever 108 is pivotally supported by a bracket 110 secured to the base 52 of the well and is adapted to be operated by a selector knob in the tape deck control unit (not shown).

The downward movement of the shaft 102 by appropriate operation of the lever 108 causes a plurality of actuator members to move outwardly into engagement with the upper surface of the flange 23 on the cartridge base 18 and to push the base downwardly against the spring 36, the downward movement of the base 18 taking place while the cover 26 of the cartridge remains fixed, thereby opening the cartridge.

More specifically, a mounting piece 112 fastened to the upper end of the shaft 102 carries three actuator members 114, located 120° apart. Each of the actuator members 114 is mounted for pivotal movement about a pin 116 in a generally radial direction with respect to the axis of the shaft 102 and includes a generally outwardly extending, cartridge engaging portion 118 at its upper end, a cam follower tip 120 at its lower end, and an inwardly extending body portion 122.

The cartridge engaging portions 118 are movable through longitudinally extending slots 130 formed in the spindle body 42. A spring 124 is installed between the ring 81, which is attached to the upper end of the shaft 102, and the upper edge of the body portion 122 of each of the actuator members 114 and urges the actuator members 114 in a direction such that the cam follower tips 120 are held adjacent a cam surface 132 formed in the lower portion of the spindle body 42. The cam surface 132 includes an inwardly and downwardly sloping conical portion **132*a* and a generally cylindrical portion 132*b* offset inwardly from the main inner surface of the body 42**.

Upon downward movement of the shaft 102, the actuator cam follower tips 120 engage and slide along the conical surface **132*a* causing the cartridge engaging portions 118 to move downwardly and outwardly through the slots 130. Upon further downward movement of the shaft 102, the tips 120 move onto the cylindrical cam surface 132*b*, thereby bringing the actuators 114** into their outermost position.

As shown in FIG. 2, the full downward movement of the shaft 102 causes the actuators to engage the upper surface of the flange portion 23 on the cartridge base 18 and pull it downwardly against the spring 36. Meanwhile, the cover 14 is supported in its previous position by the surface **60*c* on the platform 60**. Accordingly, the cartridge is opened into position for unwinding.

After the tape is recorded or played and rewound onto the cartridge, the cartridge actuator mechanism 100 is released by the reverse sequence of the actuating operations as described above and controlled by the operating knob thereby reclosing the cartridge. Additionally, the projection 80 on the trip element 77 of the platform latch 72 is engaged by the ring 81 upon upward movement of the operating shaft and thereby pivots the latch 72 in a direction such that the holding tip 75 is retracted out of the platform slot 82. The spring 66 then pushes the platform 60 upwardly to raise the cartridge, which is now closed, to the top of the well 110 where it can be removed.

The above-described embodiment of the invention is intended to be merely exemplary, and it will be understood that variations and modifications of it can be made by those skilled in the art without departing from the spirit and scope of the invention. All such variations and modifications are intended to fall within the scope of the invention as defined in the appended claims.

I claim:

1. Apparatus for supplying strip material from a coil, comprising a cartridge having a space for receiving the coil and means for normally engaging and retaining the periphery of the coil in the space; and a cartridge carrier engageable with the cartridge for rotation therewith having means operable to release the retaining means from the coil periphery when the carrier and the cartridge are rotatably engaged to permit the strip to be removed from the coil.

2. Apparatus for supplying strip material from a coil, comprising a cartridge having first and second members defining a space for the coil, the first member including a flange portion and hub portion for receiving the coil, the second member being movable relative to the first member and engageable with the coil to hold it on the first member, means carried by the cartridge for normally holding the second member in engagement with the coil to prevent the strip from being unwound from the cartridge; and a rotatable carrier for engageably supporting the cartridge and having means thereon cooperating with the holding means of the cartridge for moving the cartridge members relative to each other to release the coil and permit the strip to be unwound from the cartridge when the cartridge is engaged by the carrier.

3. Apparatus for supplying strip material from a coil, comprising a cartridge having a first member including a flange portion and a hub portion for receiving the coil, a second member movable relative to the first member and engageable with the coil to hold it on the first member, and means normally holding the second member in engagement with the coil to prevent the strip from being unwound from the cartridge; and a rotatable cartridge carrier including means for moving the cartridge members relative to each other to release the coil and permit the strip to be unwound, and elevator means movable between an upper position in which the cartridge is supported out of operative relation to the carrier, and is releasably lockable in a lower position in which the cartridge is in operative relation to the carrier.

4. Apparatus as defined in claim 3, in which the means normally holding the second member in engagement with the coil to prevent the strip from being unwound from the cartridge includes resilient means; the rotatable cartridge carrier includes a spindle having means for supporting one of the cartridge members in a predetermined position; and said means for moving the cartridge members includes releasable actuator means movable relative to the spindle to move the other cartridge member relative to the said one cartridge member to release the coil and enable the strip to be unwound from the coil.

5. Apparatus according to claim 4, wherein said supporting means includes releasable latch means for retaining said one cartridge member in said predetermined position on the spindle.

6. Apparatus as defined in claim 5, in which the releasable actuator means includes a shaft movable axially within the spindle, an actuator element carried on the shaft, the actuator element having a portion movable into engagement with said other member of the cartridge, and means cooperative with the actuator for moving the said portion thereof into engagement with the said other cartridge member upon axial movement of the shaft and for moving the said other cartridge member relative to the said one member into a position wherein the coil is released and the strip can be unwound therefrom.

7. Apparatus as defined in claim 6, in which said actuator element is pivotally mounted on the shaft for longitudinal movement therewith and pivotal in a generally radial plane with respect thereto, said actuator element also having a first portion engageable upon outward movement thereof with the other member of the cartridge and having a second cam follower portion, means forming a cam surface on the interior of the spindle and cooperative with the cam follower portion of the actuator to move the first portion of the actuator into engagement with the said other member of the cartridge upon movement of the shaft, and means is provided for selectively moving the shaft to engage the actuator with the said other cartridge member and move it relative to the said one cartridge member into a position wherein the coil is released and the strip can be unwound therefrom.

8. Apparatus according to claim 7, wherein the releasable latch means includes a trip mechanism and the shaft includes means engageable with the trip mechanism upon movement of the shaft in a direction to disengage the actuator element from the said other member of the cartridge for actuating the trip mechanism to release the platform latching means.

9. A carrier for rotatably supporting and retaining a cartridge for strip material, the carrier comprising a rotatable spindle adapted to receive the cartridge, cartridge support means rotatable with the spindle and mounted for reciprocating movement axially of said spindle, means normally urging said support means upwardly, means carried by the spindle for locking said support means releasably in a depressed position, and means including releasable actuator means for retaining a cartridge on said support means.

10. A rotatable carrier for use with a cartridge for strip material comprising a spindle adapted to receive the cartridge, cartridge support means mounted for reciprocating movement axially of said spindle, means normally urging said support means upwardly, means for locking said support means releasably in a depressed position, a shaft movable axially within the spindle, an actuator element carried on the shaft and having a first portion movable into retaining engagement with a portion of the cartridge, and means cooperative with the actuator for moving said first portion thereof into engagement with said cartridge portion upon axial movement of the shaft.

11. A rotatable cartridge carrier as defined in claim 10, in which the actuator element is pivotally mounted on the shaft for longitudinal movement therewith and for translation in a generally radial plane with respect thereto, and has a first portion engageable upon outward movement thereof with said cartridge portion and a second cam follower portion, a cam surface is formed on the interior of the spindle and is cooperative with the cam follower portion of the actuator to move said first portion of the actuator into engagement with said cartridge portion upon movement of said shaft, and means is provided for selectively moving the shaft to engage the actuator with said cartridge portion.

12. A cartridge for a coil of strip material, comprising a base member having a flange and hub for receiving the coil, a cover member axially movable without distortion relative to the base member and having a rim portion dished towards said base member, and resilient means mutually reacting with respective portions of the base and cover members for normally holding the cover member in engagement with the periphery of the coil to prevent the strip material from unwinding therefrom, said cover member being axially movable out of engagement with the coil to enable the strip material to be unwound.

13. A cartridge for a coil of strip material, comprising a base member having a hub, a first substantially flat flange extending outwardly from the lower edge of the hub for supporting the coil and a second flange extending inwardly from the hub; a cover member movable relative to the base member and including an annular cover body portion overlying the coil and formed with a peripheral downturned rim; an inwardly extending flange movable with the cover member and disposed substantially parallel to and below the inwardly extending flange of the base member; and resilient means engaging the second flange of the base member and the flange movable with the cover member to normally hold the cover member in engagement with the coil to prevent the strip from unwinding, said cover member being movable out of engagement with the coil to enable the strip material to be unwound.

14. A cartridge according to claim 13, in which the inwardly extending flange movable with the cover member includes upstanding portions extending through the second flange of the base member and relatively and yieldably movable thereto to engage the cover body portion.

References Cited

UNITED STATES PATENTS

| | | | |
|---|---|---|---|
| 3,104,848 | 9/1963 | Joffe | 242—71.8 |
| 3,136,415 | 6/1964 | Sanstrom | 206—52 |
| 1,685,010 | 9/1928 | Thornton | 242—71.1 |
| 2,951,654 | 9/1960 | Steelman | 242—55.19 |
| 3,199,802 | 8/1965 | Polley et al. | 242—55.13 |

GEORGE F. MAUTZ, *Primary Examiner.*